Patented Nov. 1, 1938

2,134,760

UNITED STATES PATENT OFFICE 2,134,760

MOLDED COMPOSITION

Kenneth M. Irey, Palisades Park, N. J., assignor, by mesne assignments, to Corn Products Refining Company, New York, N. Y., a corporation of New Jersey No Drawing. Application September 3, 1935, Serial No. 38,981

4 Claims. (Cl. 106—38)

My invention relates to improvements in the production of zein plastics. More specifically, my invention relates to the production of plastics of high tensile strength from proteinaceous mixtures containing a smaller proportion of zein than has previously been employed.

In copending application of Oswald Sturken Ser. No. 38,971 filed September 3, 1935, there has been disclosed a process for the production of zein plastics which may be rapidly cured without the necessity for prolonged contact with formaldehyde or formaldehyde vapor. According to this process, zein is mixed directly with aqueous formaldehyde and the mixture is plastified, formed into shapes, and cured by the application of heat and pressure. The plastics thus secured have highly advantageous properties, but as in the case of other molded products, it is desirable from an economic standpoint to utilize a cheaper material in conjunction with the primary binder in order to reduce the cost of the final product. However, the ordinary filling materials utilized in the other plastic arts have been found to reduce the tensile strength of zein plastics to an unwanted degree, and up to the present time no suitable filler or auxiliary reactant has been found.

I have now discovered that very satisfactory plastics may be produced from mixtures of zein and acid-treated scrap leather. This scrap leather constitutes practically an ideal auxiliary material since it produces a perfectly homogeneous product having substantially the identical properties of a straight zein plastic. Relatively large amounts of this material may be employed without appreciably decreasing the tensile strength of the product and amounts up to 50% based on the weight of the zein may be substituted without decreasing the tensile strength to too great an extent for most purposes.

The scrap leather product for use in the present invention may be prepared by steeping ordinary grades of scrap leather for a period of about 24 hours in a dilute acid solution, e. g., 2% sulphuric acid, kneading the resulting mass into a dough in hot water, washing free of acid, and finally drying and grinding the product. This procedure reduces the scrap leather to a state in which it may be uniformly incorporated with the zein to produce a homogeneous product. It will be evident, of course, that this procedure may be modified in numerous ways, e. g., by steeping at slightly elevated temperatures for shorter times, and that various equivalent procedures may be employed to attain the same end.

The acid-treated scrap leather obtained in any suitable manner may be mixed dry with the comminuted zein and the resulting mass then treated according to the process of U. S. Ser. No. 38,971, referred to above. Alternatively, of course, suitable amounts of zein and scrap leather could be simultaneously mixed with the aqueous formaldehyde solution. In any event, the plastic is prepared by the following steps:

(a) Mixing the zein and scrap leather with the aqueous formaldehyde.
(b) Plastifying the mixture.
(c) Forming the plastified mixture into the desired shapes.
(d) Curing.

The mixing may be carried out in a dough mixer and the plastifying effected on suitable rolls such as a rubber mill, or a suitable extrusion apparatus may be employed in place of the rolls, if desired. The plastified material is then transferred to suitable heated molds for final shaping and curing. In view of the slowness of the curing, it is usually undesirable from a practical standpoint to complete the cure in these molds. The material may advantageously be removed at a stage in which it is still thermoplastic so that machining blanks or other desired forms may be cut and waste material reused. The final cure may then be effected simply by baking at an elevated temperature.

The initial mixture is formed simply by adding aqueous formaldehyde of the desired concentration to the zein and scrap leather and mixing in any suitable manner, as for example, in a dough mixer. The amount of formaldehyde employed will depend to a large extent upon the nature of the product desired. However, I have found that at least 0.1% of free formaldehyde is necessary to effect a complete cure and that preferably 2% or more should be employed. From an economic standpoint it would be desirable to utilize a minimum concentration, but if certain properties such as hardness and extreme water-resistance are desired, it may be advisable to use substantially increased amounts. I have found that amounts of 10% or more of free formaldehyde may be satisfactorily employed but it will be evident that much greater amounts will involve the use of a considerable proportion of water. In general, I prefer to use from 2 to 5% of free formaldehyde. A final product containing about 10% water is usually desirable and for this purpose I prefer to utilize about 20 parts of water per 100 parts of zein in the original mixture. Since the reaction of zein and formaldehyde proceeds extremely slowly at atmospheric temperatures, a thorough mixing may be obtained without any necessity for undue speed. The material should preferably be mixed until the particles show no further tendency to stick together. In an ordinary type of dough mixer this will usually be accomplished in about ten minutes.

The plastifying operation is preferably effected on cooled rolls, since heating is usually encountered in this operation and it is desirable to maintain the temperature below that of rapid curing reaction. If the mass is maintained below 60° C. during the plastifying, curing will take place very slowly and the material may be rolled as long as necessary to secure perfect plastification. However, in order to reduce the time required for the curing reaction following stage of the process, the curing reaction may be allowed to proceed to a partial extent during plastifying. For this purpose the material may be allowed to reach a temperature of 65° C. and may be maintained at that temperature for a period of 3–5 minutes. Corresponding periods at higher or lower temperatures to effect the same degree of cure may, of course, also be employed. In any event, the material after plastifying may be stored for considerable periods of time before subjecting it to curing in the following stages of the process. Even after partial reaction during plastifying, the curing reaction will proceed further only extremely slowly if the temperature is maintained below 40° C.

The plastified material may be cured in any suitable heated molds, as for example, in the usual sheeting press. The time and temperature required for curing will depend to some extent upon the amount of formaldehyde employed and upon the thickness of the material being molded. In general, however, it will be found that a complete cure may be obtained in about 15 minutes at 100–105° C. or corresponding periods at higher or lower temperatures. The temperature employed is not critical if the time is regulated accordingly, but I prefer to cure at approximately 100–105° C. since the reaction is relatively rapid at this temperature and there is no danger of decomposition or other undesirable effects which may be encountered at higher temperatures. As has been pointed out above, it is desirable from a practical standpoint to effect only a partial cure at this stage of the process, since a complete cure requires sufficient time to limit seriously the output of a given mold. For this reason, I prefer to carry the reaction only partially to completion at this stage and to complete the cure by baking at atmospheric pressure. If it is desired to cut machining blanks or other shapes from the molded material, it is preferable to stop the reaction at this stage at a point at which the material is still thermoplastic. I have found that in general a reaction time of approximately 5 minutes at 100° C. will give a material suitable for cutting blanks and reusing the waste.

In carrying out the molding operation, I prefer to heat the molds to a temperature of about 70° C. prior to applying full pressure in order that good plastic flow may be secured and the mold will be completely filled. After the material has flowed into the mold, full pressure, for example 2000 lbs. per sq. in., may be applied and the temperature then raised to the curing point. In view of the moisture content of the material, it will of course be necessary to cool the molds prior to releasing the pressure to avoid blistering or general porosity of the product.

If the material is only partially cured in the molds, it may be stored for considerable periods of time at temperatures below 40° C. prior to further treatment, or it may be subjected directly to the final baking. If machining blanks are to be cut at this stage, this may be effected in any known manner, as for example, by the use of the usual stamping dies to produce disks from the molded sheets. The waste from such operations may be incorporated with new material on the plastifying rolls. The final shapes to be baked may be introduced into any suitable oven and maintained at the baking temperature under atmospheric pressure. Since the material is still thermoplastic at this stage, the usual care should be exercised to prevent deforming during the first stages of the baking. The baking should be effected at temperatures below 90° C. to prevent porosity due to the moisture content. Temperatures from 60–90° C. are generally satisfactory, but I prefer to employ a temperature of about 80° C. At this temperature a full cure may be obtained in from 8–10 hours. Corresponding shorter or longer periods of time should of course be employed at higher or lower temperatures.

My invention may further be illustrated by the following specific examples:

Example I 80 parts of dry powdered zein and 20 parts of ground acid-treated scrap leather were mixed with 20 parts of an aqueous solution containing 2 parts of free formaldehyde (15 parts of water plus 5 parts of 40% aqueous formaldehyde). This mass was mixed in a dough mill for 10 minutes, at the end of which time the particles ceased to show a tendency to stick together. The material was then transferred to cooled plastifying rolls and rolled until the temperature reached 65° C. The rolling was then continued at this temperature for 4 minutes, after which the material was removed in the form of sheets and placed in a heated sheeting press. The temperature was raised to 70° C. to secure plastic flow and a pressure of 2000 lbs. per sq. in. was then applied and the temperature raised to 100° C. After 15 minutes at this temperature, the mold was cooled to 30° C. and the material removed. The product thus obtained was hard and tough, having a tensile strength of approximately 12,000 lbs. per sq. in.

Example II 65 parts of dry powdered zein and 35 parts of ground acid-treated scrap leather were mixed with formaldehyde solution and plastified as in Example I. The sheets from the plastifying rolls were then cured in the sheeting press for approximately 5 minutes at 2000 lbs. per sq. in. The resulting partially cured sheets were then cut into disks by means of the usual stamping dies and the disks thus obtained were baked at 80° C. for 9 hours. The fully cured disks were found to have a tensile strength of approximately 8000 lbs. per sq. in.

In general, the products obtained by the present process are hard tough plastics having good strength and elasticity and a satisfactory finish. The materials are sufficiently tough and elastic for machining and show no tendency to gum up the tool when it becomes hot. The appearance of the product is quite satisfactory although the color will be found to be somewhat darker than straight zein plastics, depending upon the proportion of scrap leather employed. However, even with high proportions of scrap leather in the mixture the products will be found to be quite suitable for the production of medium and dark shades when the usual pigments and dyes are employed.

It is to be understood, of course, that my invention is not to be construed as limited to the particular procedure specified in the above example. For instance, plastifying might be effected in an extrusion machine, in which case the extruded forms could be cured by baking without intermediate molding. A further modification would be to combine the plastifying and preliminary curing by effecting these steps on heated calender rolls, thus obtaining sheets suitable for final baking. Likewise, the compositions of the original mixture may be modified in any manner known to the art. Any of the usual modifying agents such as plasticizers, lubricants, pigments, etc. may be employed. In general, it may be said that known equivalents and any modifications of procedure which would occur to one skilled in the art may be employed without departing from the scope of my invention.

My invention now having been described, what I claim is:

1. A composition of matter homogeneous and uniform throughout comprising a reaction product of formaldehyde and a mixture of zein and acid-treated scrap leather.

2. A composition of matter homogeneous and uniform throughout comprising a reaction product of formaldehyde and a mixture comprising zein and 5–50% by weight of acid-treated scrap leather.

3. A composition of matter, homogeneous and uniform throughout comprising the reaction product of a mixture of zein and acid-treated scrap leather and at least 0.1% of formaldehyde, based on the weight of said mixture.

4. A composition of matter, homogeneous and uniform throughout comprising the reaction product of a mixture of zein and 5–50% by weight of acid-treated scrap leather and from 2 to 5% of formaldehyde, based on the weight of said mixture.

KENNETH M. IREY.